United States Patent [19]

McConville et al.

[11] Patent Number: 4,968,063

[45] Date of Patent: Nov. 6, 1990

[54] TRANSPARENT TAMPER-INDICATING DOCUMENT OVERLAY

[75] Inventors: John W. McConville, New Richmond, Wis.; Susan K. Jongewaard, North St. Paul; Douglas K. Fossum, Shoreview, both of Minn.

[73] Assignee: Minnesota Mining and Manufacturing Company, St. Paul, Minn.

[21] Appl. No.: 409,098

[22] Filed: Sep. 19, 1989

[51] Int. Cl.5 ........................ B42D 15/00; G02B 5/128

[52] U.S. Cl. ...................................... 283/72; 350/105; 350/106; 283/117; 283/67; 283/74

[58] Field of Search ............... 380/105, 109, 106, 107; 283/67, 81, 101, 107, 108, 109, 106, 105, 72, 74, 90, 91, 98, 901; 156/292, 277; 40/135

[56] References Cited

U.S. PATENT DOCUMENTS

| | | | |
|---|---|---|---|
| 3,237,331 | 3/1966 | Gill | 350/107 |
| 3,801,183 | 4/1974 | Sevelin et al. | 350/105 |
| 3,898,086 | 8/1975 | Franer et al. | 96/28 |
| 3,919,031 | 11/1975 | White | 350/106 |
| 4,099,838 | 7/1978 | Cook et al. | 350/105 |
| 4,184,701 | 1/1980 | Franklin et al. | 283/67 |
| 4,377,988 | 3/1983 | Tung et al. | 350/105 |
| 4,496,618 | 1/1985 | Pernicano | 350/105 |
| 4,630,891 | 12/1986 | Li | 350/105 |
| 4,688,894 | 8/1987 | Hockert | 350/105 |
| 4,691,993 | 9/1987 | Porter et al. | 350/105 |
| 4,713,365 | 12/1987 | Harrison | 503/227 |
| 4,728,983 | 3/1988 | Zwadlo et al. | 335/4 |
| 4,763,985 | 8/1988 | Bingham | 350/105 |

*Primary Examiner*—Douglas D. Watts
*Assistant Examiner*—Thomas Hamill, Jr.
*Attorney, Agent, or Firm*—Donald M. Sell; Walter N. Kirn; Robert H. Jordan

[57] ABSTRACT

A transparent overlay that can protect a document from tampering has a transparent cover sheet, a layer of hot-melt adhesive over one surface of the transparent cover sheet, and an image formed on the exposed face of said hot-melt adhesive layer. The transparent cover sheet can be a simple thermoplastic film but preferably is retroreflective sheeting which can bear a pattern or legend that is noticeable only when viewed retroreflectively.

11 Claims, 1 Drawing Sheet

TRANSPARENT TAMPER-INDICATING DOCUMENT OVERLAY

CROSS-REFERENCE TO RELATED APPLICATION

This application is related to an application entitled "Transparent Overlay For Protecting A Document From Tampering" filed of even date and commonly assigned herewith and incorporated herein by reference.

BACKGROUND OF THE INVENTION

1. Field of the Invention

The invention is concerned with transparent overlays to protect documents from tampering and is especially concerned with such overlays which contain patterns and legends that are difficult to counterfeit and thus also function to authenticate the documents.

2. Description of the Related Art

Documents often have adherent transparent overlays to provide protection against dirt, moisture, and general wear and tear. A typical transparent overlay has a plastic film bearing an aggressive adhesive layer by which it can be permanently adhered to the face of a document. When the plastic film incorporates a message such as a design that does not obscure the underlying information, a transparent overlay can afford an additional degree of protection, especially when the message-containing plastic film is difficult to remove without being destroyed and also is difficult to counterfeit. For example, many credit cards presently are made to exhibit holographic images which may be transparent but often are opaque and thus confined to an area not bearing information.

Even when the plastic film of an overlay is made to be too fragile to be removed as a single piece or, if removed, so contorted that it cannot be reapplied, a nagging concern remains that a clever, deft person might be able to remove it without undue damage (e.g., by the use either of hot or exceedingly cold temperatures) and to alter the face of the document (e.g., by replacing a portrait or photograph that identifies the bearer). Even when doing so would be discernible under expert examination, ordinary use of most documents usually precludes such an examination except under extraordinary circumstances. For example, when the document is a passport, a customs official rarely is allowed more than a minute or two to check both the document and its bearer unless there is some external evidence to suggest a more careful examination.

A transparent overlay which can contain a pattern or legend that does not obscure underlying information is disclosed in U.S. Pat. No. 3,801,183 (Sevelin et al.). That pattern or legend is invisible or only faintly visible to the naked eye under diffuse light and becomes readily legible only when viewed retroreflectively. Such overlays are currently manufactured and sold as CONFIRM brand security film by the Minnesota Mining and Manufacturing Company.

Because the CONFIRM brand security film is fragile and has a layer of an aggressive adhesive by which it can be bonded permanently to a document, it may be impossible to peel the sheeting from the document and reapply it without leaving readily noticeable evidence of tampering. Nevertheless, some issuers of documents request even greater assurance against tampering.

Subsequent to the aforementioned U.S. Pat. No. 3,801,183, a number of patents have issued disclosing other transparent overlays, each of which can be imaged with a pattern or legend that is noticeable only when viewed retroreflectively and can be adhesively bonded to a document without obscuring the face of the document. See, for example, U.S. Pat. No. 4,099,838 (Cook et al.), the overlay of which has the additional feature of causing the color of the reflection in the background areas to be different from the color of the reflection in the image areas. See also U.S. Pat. Nos. 4,688,894 (Hockert) and 4,691,993 (Porter et al.), each of which discloses a transparent overlay that functions in the same way as that of the Sevelin patent while having the added capability of permitting an authenticating message to be formed in the overlay after it has been adhesively bonded to a document. However, none of the transparent overlays of those three patents offers better assurance against unnoticeable tampering than does the overlay of the aforementioned U.S. Pat. No. 3,801,183 or the CONFIRM brand security film.

SUMMARY OF THE INVENTION

The invention provides a transparent overlay to be permanently laminated to a document, which overlay bears information associated with the document. Because the information is part of the overlay, it would be necessary to destroy the overlay in order to tamper with that information after the overlay has been laminated to a document.

Briefly, the overlay of the invention comprises (a) a transparent flexible cover sheet, (b) a layer of hot-melt adhesive over one surface of said transparent cover sheet, which adhesive has a Tg of at least about −15° C., and (c) an image formed on the exposed face of said hot-melt adhesive layer, which image is visible through said transparent cover sheet.

By "transparent" as used to characterize the novel overlay and its cover sheet, is meant that said image and any underlying image can be readily viewed through the overlay and its cover sheet.

The transparent flexible cover sheet of the overlay of the invention preferably incorporates a pattern or legend that is readily legible only when viewed retroreflectively, e.g., a transparent sheet of any of the aforementioned U.S. Pat. Nos. 3,801,103; 4,099,838; 4,688,894; and 4,691,993. As noted above, each such sheet incorporates means for creating a pattern or legend that is readily legible only when viewed retroreflectively and that is obscure, i.e., is invisible or only faintly visible to the naked eye, under diffuse light. Because such a sheet is typically flimsy, it is virtually impossible to remove it as a single, undistorted piece from a substrate to which it has been permanently bonded with an aggressive adhesive. Because of its sophisticated construction, persons wanting to tamper should be unable to reproduce its retroreflectively viewable pattern or legend. Furthermore, the transparent sheeting of any of those patents can prevent two documents from being cut apart and combined into a single, fraudulent document when their overlays bear retroreflective patterns or legends that would be difficult or impossible to match, and the intersection between the two reflective areas would appear black when viewed retroreflectively.

The transparent cover sheet of the novel overlay can be simple thermoplastic film, because even if someone were able to remove that film from a document as a single piece without undue distortion, it would carry at least part of any image that had been formed on the layer of hot-melt adhesive, thus making it virtually impossible to reconstruct the overlay-document laminate after tampering.

An image can be formed on the exposed face of said hot-melt adhesive layer by any of several techniques. Preferred techniques employ dry toner, liquid toner, or ink-jet printing. Another technique employs a thermal mass transfer donor element that may contain a pigment or dye and is positioned face-to-face with the hot-melt adhesive layer, whereupon a thermal print head can selectively apply heat from the back of the donor element to transfer color and binder to the hot-melt adhesive. This process can be repeated using additional colors to provide a three-color or four-color transfer image. For a discussion of a comparable thermal imaging process, see U.S. Pat. No. 3,898,086 (Franer et al.).

It is remarkable that sharp images can be formed on the hot-melt adhesive layer, especially when heat is employed to do so. It is even more remarkable that upon applying heat to laminate the novel overlay to the face of a document, those images can substantially retain their original sharpness.

DETAILED DISCLOSURE

The hot-melt adhesive of the novel overlay preferably forms strong bonds to paper and other materials of which documents to be protected are made. A preferred class of hot-melt adhesives that forms strong bonds is linear, random copolyesters of one or more aromatic dibasic acids and one or more aliphatic diols, modified with up to about 30 mole % of one or more aliphatic dibasic acids, as in U.S. Pat. No. 4,713,365 (Harrison). Among other useful classes of hot-melt adhesives are ethylene/vinyl acetate (EVA) copolymers, ethylene/acrylic acid (EAA) copolymers, ethylene/ethyl acrylate (EEA) copolymers, ethylene/methyl acrylate (EMA) copolymers, and polyethylene.

Hot-melt adhesives which do not form strong bonds to documents can be used in the novel overlay because delamination of the overlay and a protected document would destroy the overlay and with it, the image. For example, when the image includes a portrait, it would be virtually impossible to substitute another portrait without somehow removing as much of the hot-melt adhesive layer as contains the portrait. It then would be necessary to reconstruct the hot-melt adhesive layer and to apply a new portrait. Anyone having the skill to do that should have the skill to counterfeit the document from the beginning, while finding it easier to do so.

The Tg of the hot-melt adhesive of the novel overlay should be from about −15° to about 150° C. At substantially lower Tg, there would be a danger of image blurring or image migration. At a Tg substantially higher than said preferred range, it would be necessary to employ undesirably high temperatures to laminate the novel overlay to a document. Preferably the Tg of the hot-melt adhesive is from about 40° C. to about 100° C.

The layer of hot-melt adhesive preferably is at least about 50 μm (microns) in thickness when the document to which the overlay is to be applied is porous like paper. A thickness of about 25 μm would be adequate when the document is smooth, e.g., a plastic film or plastic-coated paper. Even when the document is smooth, the thickness of the hot-melt adhesive preferably is at least about 50 μm when the transparent covering of the novel overlay is retroreflective sheeting, and dye or pigment is used to form the image on the hot-melt adhesive layer. Substantially thinner layers might result in migration of the imaging dye from the hot-melt adhesive layer into the bead-bond layer of the retroreflective sheeting. On the other hand, if the thickness of the hot-melt adhesive were to exceed about 200 μm, this would be wasteful of raw materials. Furthermore, it can be difficult to form uniform coatings of the hot-melt adhesive at substantially greater thicknesses.

When the transparent flexible cover sheet of the novel overlay is a simple thermoplastic film, the face of the document to be protected preferably is first imaged (e.g., by printing) to show a pattern that differs in position from document to document. Then, if someone were to attempt to combine two documents (e.g., by cutting out a photograph from one passport to use with a different passport), it would be virtually impossible to match their background patterns.

When the transparent flexible cover sheet of the novel overlay is a simple thermoplastic film, it preferably is biaxially oriented poly(ethylene terephthalate), as such films are typically scratch-resistant and have good transparency and good dimensional stability over a wide range of temperatures. Other useful simple thermoplastic films include polycarbonates, polyimides, cellulose acetate, and polyethylene. A simple transparent film preferably is so thin that any effort to peel the novel overlay from a document would either cause the transparent film to break or become distorted.

When dye or pigment is used to image the hot-melt adhesive layer and the transparent cover sheet is retroreflective sheeting, the layer of hot-melt adhesive can be quite thin by employing, between the adhesive and the transparent cover sheet, a barrier layer that inhibits the migration of the image into the bead-bond layer of the retroreflective sheeting. A preferred barrier layer is made from Scotch™ Y-110 release solution (from 3M Co.) which is polyvinyl alcohol dissolved in isopropyl alcohol and deionized water. This barrier layer is effective in thicknesses on the order of about 1 μm.

In using the novel overlay to protect a document, a preferred procedure involves the steps of (a) preprinting the document with information standard to all like documents, e.g., with boxes labeled to receive a bearer's name, address, birth date, etc., (b) forming on the exposed surface of the hot-melt adhesive layer a mirror image of information specific to the bearer, optionally including the bearer's portrait, and (c) bonding the overlay over the standard information by means of its hot-melt adhesive layer. If, subsequently, someone were to be able to peel off the overlay, it would carry with it at least some of the image, leaving the standard information and any remaining portion of the image on the document. Then to change the image, one would need to erase any part of the image that remains on both the document and the overlay while constructing a new image on either the document or the overlay because it would be virtually impossible to reconstruct the images at both surfaces to make them match upon reassembly.

THE DRAWINGS

The invention may be more easily understood in reference to the drawings, both figures of which are schematic. In the drawings.

Figure 1:
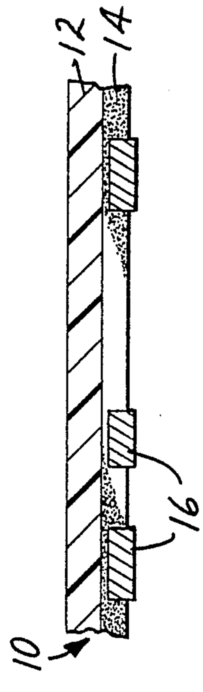
FIG. 1 is a fragmentary edge view of a transparent overlay of the invention.

In FIG. 1, a transparent overlay 10 has a transparent flexible cover sheet 12, specifically a thermoplastic film. On the cover sheet is a hot-melt adhesive layer 14, the exposed surface of which has received a mirror image 16.

Figure 2:
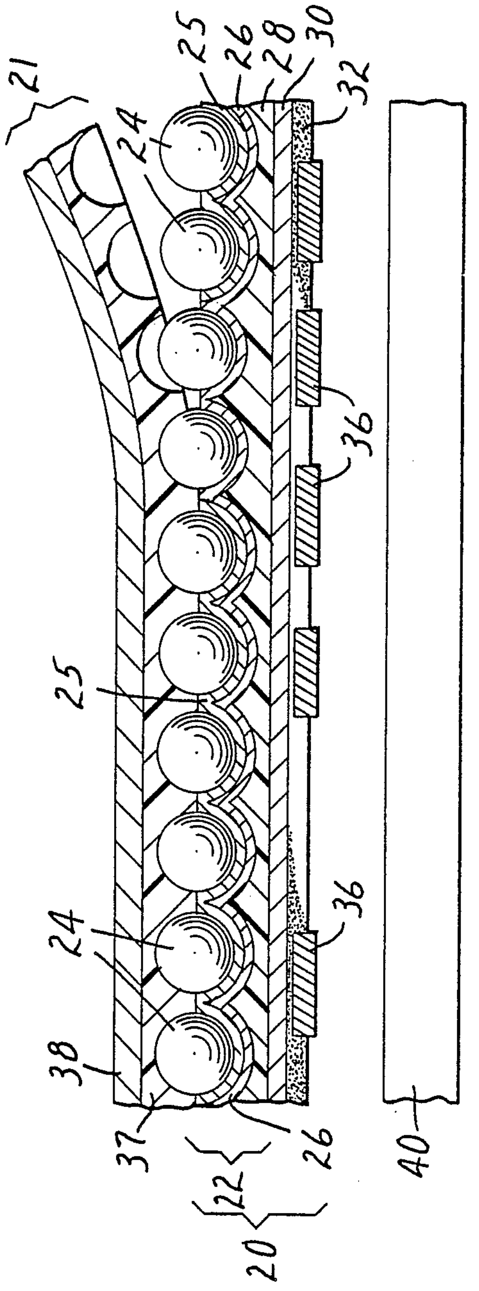
FIG. 2 is a fragmentary edge view of another transparent overlay of the invention which incorporates a pattern that is noticeable only when viewed retroactively, which overlay is shown in position to be laminated to the face of a document to protect against tampering, and with its temporary carrier being stripped off.

In FIG. 2, a transparent overlay 20, with removable carrier 21 attached, has a flexible cover sheet 22 including a monolayer of glass beads 24, a selectively imprinted transparent lacquer layer 25, a transparent dielectric layer 26 of optical thickness approximately one-fourth of the wavelength of light, and a bead-bond layer 28. The lacquer layer provides a pattern or legend that is noticeable only when viewed retroreflectively. The transparent overlay 20 also has a barrier layer 30 to prevent migration of image 36 into the bead-bond layer 28, and a hot-melt adhesive layer 32, the exposed surface of which has received a mirror image 36.

The transparent overlay 20 is assembled by cascading a substantial monolayer of glass beads onto a release material 37 (typically attached to a paper layer 38) of the carrier 21, selectively imprinted to provide the lacquer layer 25, and then vapor-coated with the dielectric layer 26, followed by the coating of layers 28, 30, and 32. After forming the mirror image 36 and then laying the adhesive layer 32 onto a substrate 40 (such as a page of a passport), heat is applied to laminate the transparent overlay 21 to the substrate, after which temporary carrier 26 is peeled off as indicated in FIG. 2.

EXAMPLE 1

Onto a transparent, retroreflective cover sheet as illustrated in FIG. 2 was laminated a 50 μm film of a hot-melt adhesive comprising ethylene/acrylic acid copolymer. The resulting overlay was substituted for the image-receiving sheet in an electrophotographic, liquid-toner, imaging device as disclosed in U.S. Pat. No. 4,728,983 (Zwadlo et al.). The device creates color half-tone images on an organic photoconductor from digital input at 1500 dots/in. (590 dots/cm) and 144 gray levels. In this example, a color, passport-size portrait was imaged electrophotographically with liquid toner on the photoconductor, and the overlay was passed through the transfer nip at ¼ normal speed with the adhesive layer facing the photoconductor. The portrait transferred completely to the adhesive as the overlay passed through the transfer nip. Density and resolution of the image on the overlay were good both before and after lamination to ordinary copy paper at 110° C. with a hot-roll pressure laminator (TLC Model 6000 desk-top laminator).

EXAMPLE 2

A transparent, retroreflective overlay was prepared as in Example 1 except that its ethylene vinyl acetate (EVA) ELVAX 550 from E. I. du Pont. This overlay was taped to an 8.5×11 inch (21×28 cm) sheet of plain paper with the adhesive layer exposed. The sheet was then fed through a LaserJet Series II electrophotographic printer available from Hewlett-Packard which creates 300 dots/in. (118 dots/cm) black and white images in the form of dry toner powder on a reuseable photoconductor. An image was transferred and fused to the adhesive layer of the overlay. The image had good density and resolution and was fused well enough to tolerate normal contact. The overlay was then removed from the sheet of plain paper and laminated to ordinary copy paper at 100° C. with no loss in image quality. Accelerated aging of the laminated sample at 65° C. for two months produced no degradation.

EXAMPLE 3

A transparent overlay was prepared as in Example 1 except that the cover sheet was clear 7 mil (0.175 mm) biaxially-oriented poly(ethylene terephthalate) film, and the adhesive was a 50% solids solution of low-molecular-weight copolyester (VITEL 222 from Goodyear) having a 5 mil (0.125-mm) wet thickness. The coating was air-dried for 5 minutes and oven-dried at 150° F. (65° C.) for 30 minutes. The adhesive side of the overlay was imaged as in Example 2. The image had good density and resolution, both before and after lamination at 300° F. (150° C.) to a white, 12 mil (0.3 mm), rigid PVC substrate. A peel test resulted in tearing the overlay.

Various modifications and alterations of this invention will become apparent to those skilled in the art without departing from the scope and spirit of this invention.

What is claimed is:

1. A transparent overlay by which a document can be protected from tapering said overlay comprising:

(a) a transparent flexible cover sheet;

(b) a layer of hot-melt adhesive over one surface of said transparent cover sheet, which adhesive has a glass transition temperature of at least about −15° C.; and (c) an image formed on the exposed face of said hot-melt adhesive layer, which image is visible through said transparent cover sheet.

2. A transparent overlay as defined in claim 1 wherein said transparent cover sheet is a thermoplastic film.

3. A transparent overlay as defined in claim 1 wherein said transparent cover sheet is retroreflective sheeting which incorporates means for bearing a pattern or legend that is readily legible only when viewed retroreflectively.

4. A transparent overlay as defined in claim 1 wherein said hot-melt adhesive has a a glass transition temperature of from about 40° C. to about 100° C.

5. A transparent overlay as defined in claim 4 wherein said hot-melt adhesive comprises a linear, random copolyester of one or more aromatic dibasic acids and one or more aliphatic diols, modified with up to about 30 mole % of one or more aliphatic dibasic acids.

6. A transparent overlay as defined in claim 1 wherein the thickness of said hot-melt adhesive is from about 25 to about 200 μm.

7. A transparent overlay as defined in claim 1 and further comprising a barrier layer between the hot-melt adhesive layer and the cover sheet.

8. A document having a transparent overlay comprising:

(a) a transparent flexible cover sheet;

(b) a layer of hot-melt adhesive over one surface of said transparent cover sheet, which adhesive has a glass transition temperature of at least about −15° C.; and (c) an image formed on the exposed face of said hot-melt adhesive layer, which image is visible through said transparent cover sheet;

said overlay being laminate to said document by said hot-melt adhesive.

9. A document as defined in claim 8 wherein said transparent cover sheet comprises retroreflective sheeting.

10. A document as defined in claim 8 wherein said retroreflective sheeting bears a pattern or legend that is readily legible only when the document is viewed retroreflectively.

11. A document as defined in claim 8 wherein said transparent cover sheet is a thermoplastic film.

* * * * *

UNITED STATES PATENT AND TRADEMARK OFFICE

CERTIFICATE OF CORRECTION

PATENT NO. : 4,968,063

DATED : November 6, 1990

INVENTOR(S) : John W. McConville et al.

It is certified that error appears in the above-identified patent and that said Letters Patent is hereby corrected as shown below:

In Column 5, line 61, after the word "its" insert --adhesive was an--.

In Column 6, line 29, after the word "tampering" insert a comma.

In Column 6, line 46, delete the second word "a".

In Column 7, line 1, "laminate" should read --laminated--.

Signed and Sealed this

Twenty-first Day of April, 1992

*Attest:*

HARRY F. MANBECK, JR.

*Attesting Officer*

*Commissioner of Patents and Trademarks*